(12) United States Patent
Pan

(10) Patent No.: US 7,486,974 B2
(45) Date of Patent: Feb. 3, 2009

(54) HINGED DEVICE

(75) Inventor: Long-Jyh Pan, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 638 days.

(21) Appl. No.: 11/137,332

(22) Filed: May 26, 2005

(65) Prior Publication Data
US 2005/0266901 A1    Dec. 1, 2005

(30) Foreign Application Priority Data
May 28, 2004    (TW)    ............................. 93115234 A

(51) Int. Cl.
H04M 1/00    (2006.01)
(52) U.S. Cl. ................. 455/575.3; 455/575.1
(58) Field of Classification Search ............... 455/575.3
See application file for complete search history.

(56) References Cited

U.S. PATENT DOCUMENTS

| | | | | |
|---|---|---|---|---|
| 4,234,285 A * | 11/1980 | Martinez | ..................... | 414/462 |
| 5,207,622 A * | 5/1993 | Wilkinson et al. | ............ | 482/54 |
| 5,608,604 A * | 3/1997 | Francis | ....................... | 361/681 |
| 5,937,062 A | 8/1999 | Sun et al. | | |
| 6,098,243 A * | 8/2000 | Kim | ............................ | 15/390 |
| 6,148,079 A * | 11/2000 | Chintala et al. | ........ | 379/433.13 |
| 6,148,480 A * | 11/2000 | Cooke | ......................... | 16/303 |
| 6,288,896 B1 * | 9/2001 | Hsu | ............................. | 361/687 |
| 6,486,834 B2 * | 11/2002 | Tsai | ............................ | 343/702 |
| 6,633,643 B1 * | 10/2003 | Ona | ........................ | 379/433.13 |
| 6,886,221 B2 * | 5/2005 | Minami et al. | ................. | 16/324 |
| 6,950,686 B2 * | 9/2005 | Won | .......................... | 455/575.3 |
| 6,985,580 B2 * | 1/2006 | Lu et al. | ................. | 379/433.13 |
| 7,076,280 B2 * | 7/2006 | Oshima | .................... | 455/575.3 |
| 7,171,247 B2 * | 1/2007 | Han | .......................... | 455/575.3 |
| 7,212,845 B2 * | 5/2007 | Ikeuchi | ..................... | 455/575.3 |
| 7,269,442 B2 * | 9/2007 | Sato et al. | ................ | 455/556.1 |
| 7,334,296 B2 * | 2/2008 | Park | ............................ | 16/330 |
| 7,346,377 B2 * | 3/2008 | Sakai et al. | .............. | 455/575.3 |
| 2002/0123366 A1 * | 9/2002 | Doraiswamy et al. | ........ | 455/550 |
| 2004/0023700 A1 * | 2/2004 | Gupte | ...................... | 455/575.3 |
| 2004/0224730 A1 * | 11/2004 | Sakai et al. | .............. | 455/575.3 |
| 2004/0254000 A1 * | 12/2004 | Chen | ........................ | 455/575.3 |
| 2005/0079901 A1 * | 4/2005 | Tracy et al. | .............. | 455/575.3 |
| 2005/0138771 A1 * | 6/2005 | Su | ............................. | 16/330 |
| 2005/0148375 A1 * | 7/2005 | DeLine | ..................... | 455/575.3 |
| 2005/0176475 A1 * | 8/2005 | Sawamura | ............... | 455/575.3 |
| 2005/0245294 A1 * | 11/2005 | Gupte et al. | .............. | 455/575.1 |
| 2006/0148540 A1 * | 7/2006 | Satoh et al. | .............. | 455/575.3 |
| 2007/0255191 A1 * | 11/2007 | Cozzo et al. | ................... | 602/23 |

* cited by examiner

Primary Examiner—Matthew D Anderson
Assistant Examiner—Hai V Nguyen

(57) ABSTRACT

A hinged device. A first frame comprises a first contact surface and a first through hole. A second frame rotatably connects to the first frame. A second cam is movably disposed in the second frame, comprises a second contact surface abutting the first contact surface and a second through hole. When the first and second frames are rotated oppositely around a first direction, the second cam moves along the first direction. An elastic member is disposed between the second frame and the second cam, providing a first elastic force on the second cam. An electrical transmission media passes through the first and second through holes.

15 Claims, 11 Drawing Sheets

HINGED DEVICE

BACKGROUND OF THE INVENTION

1. Field of the Invention

The invention relates to a hinged device, and in particular, to a hinge module thereof.

2. Brief Discussion of the Related Art

A hinged device typically employs a hinge module for mounting a cover onto a handset, enabling the cover to move between open and closed positions. FIG. 1A shows a hinge module for this purpose disclosed in U.S. Pat. No. 5,937,062. The hinge module 1 comprises a telescoping member 13, a guide 14, a spring 15, a first cam 16 and a second cam 17. The first cam 16 comprises a first curved portion 161, and the second cam 17 comprises a second curved portion 171 corresponding to the first curved portion 161.

Referring to FIG. 1B, the hinge module 1 is assembled by coupling the first cam 16 and the second cam 17, loading the spring 15 between the guide 14 and the second cam 17, inserting the telescoping member 13 through the guide 14, the spring 15, the first cam 16 and the second cam 17, and then riveting the end 133 of the telescoping member 13 to the end 163 of the first cam 16. Note that when the hinge module 1 is assembled, a gap d is formed the guide 14 and the second cam 17.

When the hinge module 1 is assembled in a hinged device, both ends of the assembled hinge module 1 are pressed against a groove formed thereon. When the hinged device is operated, the second cam 17 rotates with respect to the guide 14. This changes the contact position of the first curved portion 161 of the first cam 16 with the second curved portion 171 of the second cam 17. Thus, when the first curved portion 161 is not completely coupled with the second curved portion 171, torsion is generated causing the first cam 16 to rotate with respect to the second cam 17. Therefore, the second cam 17 is moved toward the guide 14 between the gap d. Thus, the hinge module 1 can be easily mounted onto a hinged device, and serves as a rotating axis of the hinged device.

The mentioned hinge module 1, however, is large and requires excessive interior space in the hinged device, which is already at a premium due to the increasing number of functions, such as built-in capture devices.

It is therefore desirable to provide a device with a hinge module further requiring less space in the interior of the device.

SUMMARY OF THE INVENTION

Accordingly, a hinged device is disclosed. The device comprises a first frame, a second frame, a hinge module, and an electrical transmission media. The hinge module comprises a second cam and an elastic member. The first frame comprises a first contact surface and a first through hole. The second frame is rotatably connected to the first frame. The second cam is movably disposed in the second frame and comprises a second contact surface abutting the first contact surface and a second through hole. When the first and second frames are rotated oppositely according to a first direction, the second cam is moved along the first direction. The elastic member is disposed between the second frame and the second cam, providing a first elastic force on the second cam. The electrical transmission media passes through the first and second through holes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
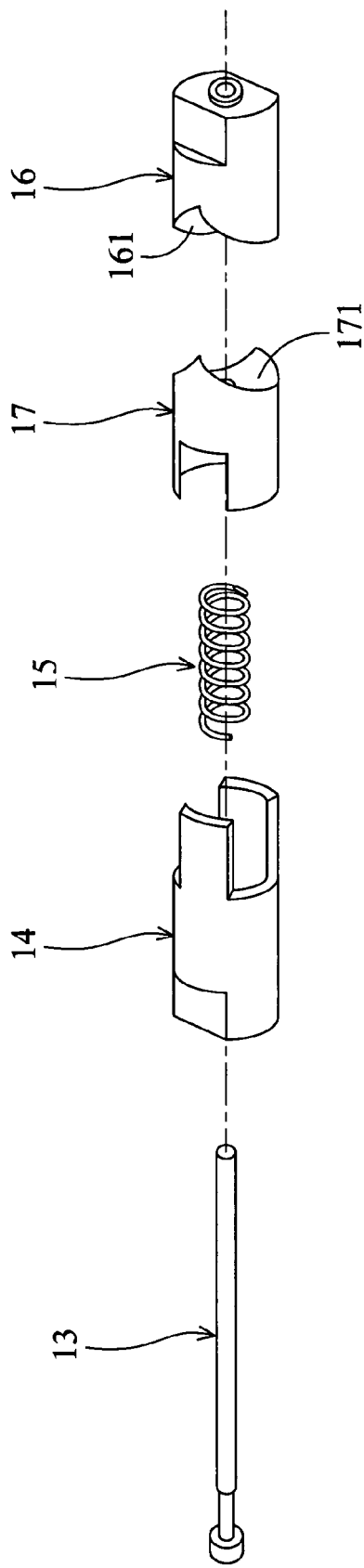
FIG. 1A is an exploded perspective view of a conventional hinge module.
Figure 1B:
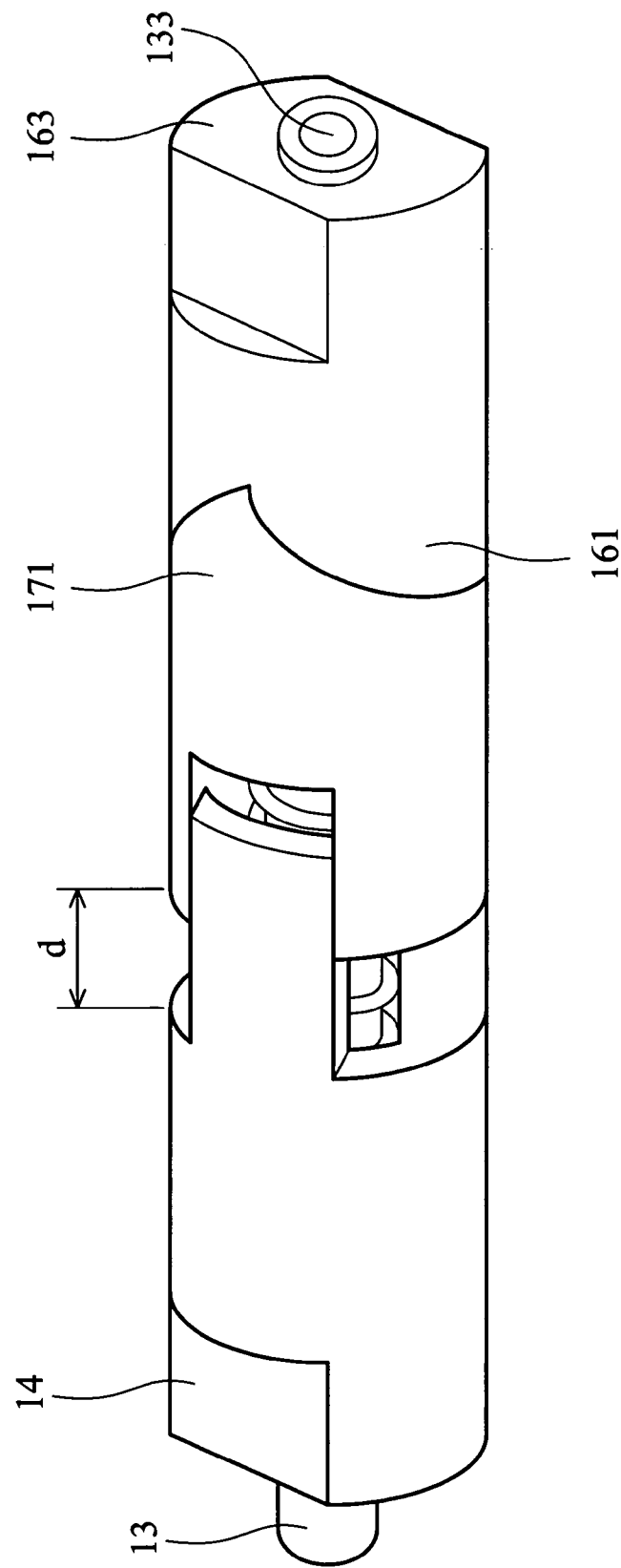
FIG. 1B is a perspective view of the assembled hinge module.
Figure 2A:
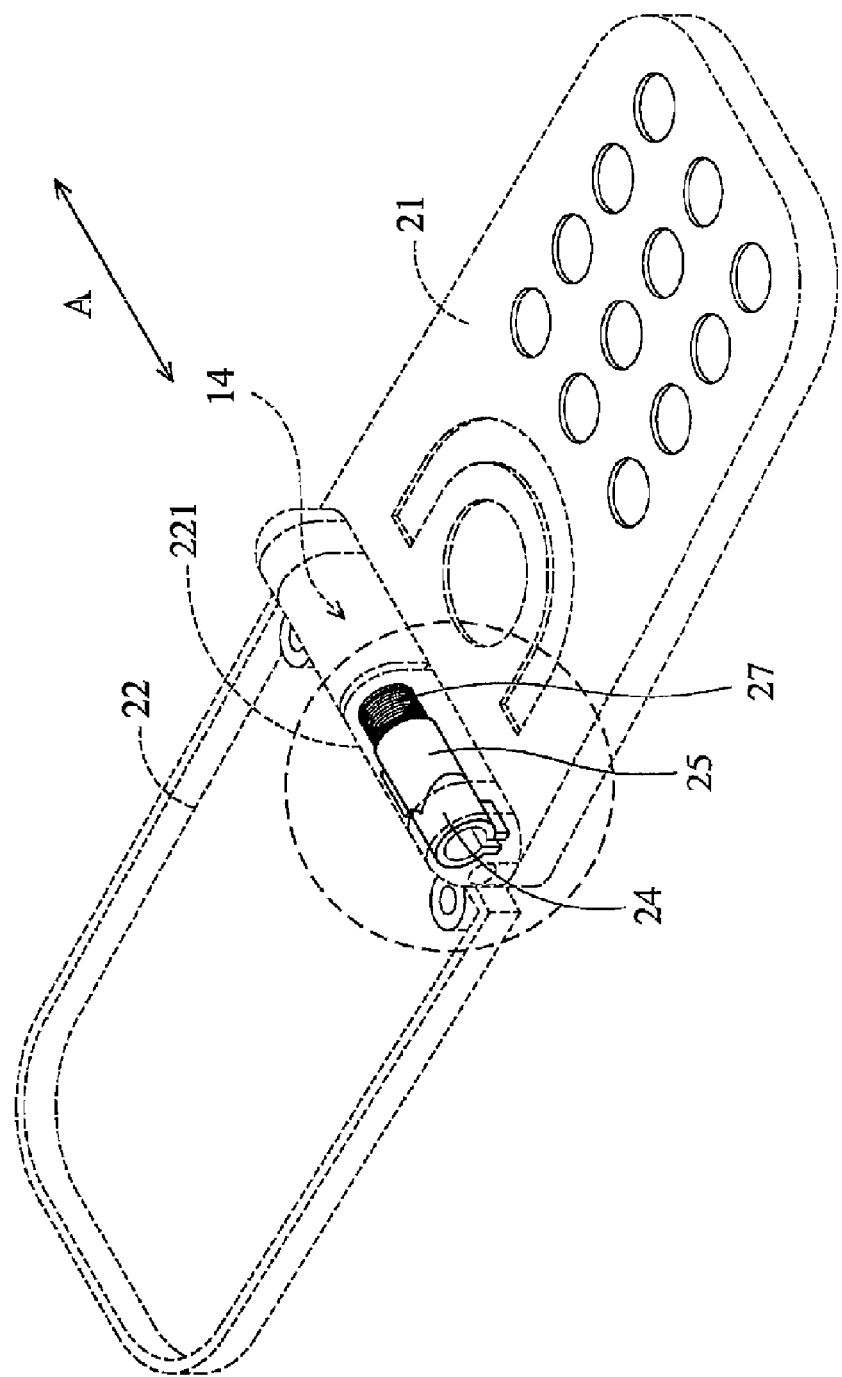
FIG. 2A is a schematic diagram of a hinged device of an embodiment of the invention.
Figure 2B:
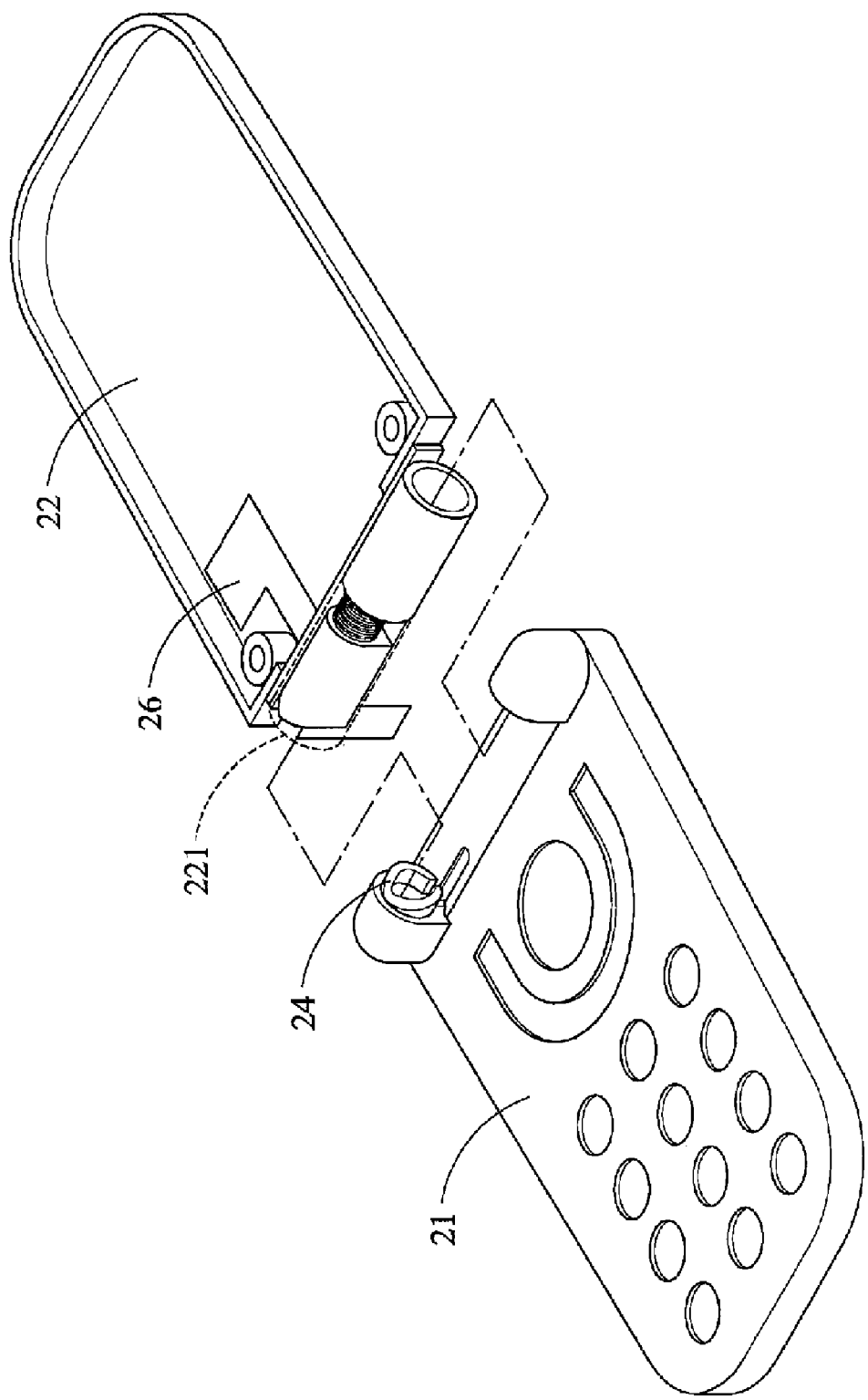
FIG. 2B is an exploded perspective view of the hinged device of an embodiment of the invention.

FIGS. 2A and 2B show an embodiment of a hinged device of the invention. FIG. 2A is a schematic diagram of the hinged device and FIG. 2B is a partly exploded perspective view of the hinged device.

The hinged device comprises a first frame 21, a second frame 22, a hinge module, and an electrical transmission media 26. In this embodiment, the hinge module comprises a first cam 24, a second cam 25, and an elastic member 27. The first frame 21 is hinged to the second frame 22 and the first and second frames 21 and 22 rotate oppositely around a first direction (as the arrow showing in FIG. 2A). The first cam 24 is fixed on the first frame 21, or the first cam 24 and the first frame 21 are integrally formed. The second frame 22 comprises a receiving slot 221, and second cam 25 is movably disposed in the second frame 22. The elastic member 27 is disposed in the second frame 22 and abuts the second cam 25. The elastic member 27 provides a first elastic force on the second cam 25. In this embodiment, the hinged device may be a portable telephone, a mobile electronic device, a notebook computer, or similar. The hinge module of the invention may, however, be utilized in any kind of hinged device. The first cam 24 and the second cam 25 of the hinge module can comprise plastic. The first cam 24 and the second cam 25 are preferably metal to prevent electromagnetic interference (EMI). The electrical transmission media 26 may be a flexible printed circuit board (FPCB), a power line, a wire, or similar. The elastic member 27 may be a spring.

Figure 3B:
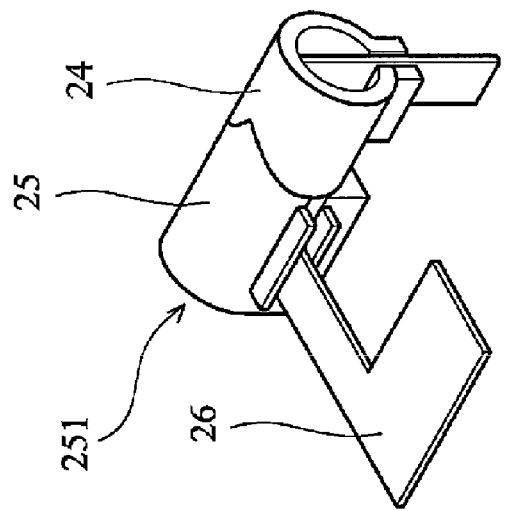
FIG. 3B is a schematic diagram of an electrical transmission media passed through first and second through holes.
Figure 3A:
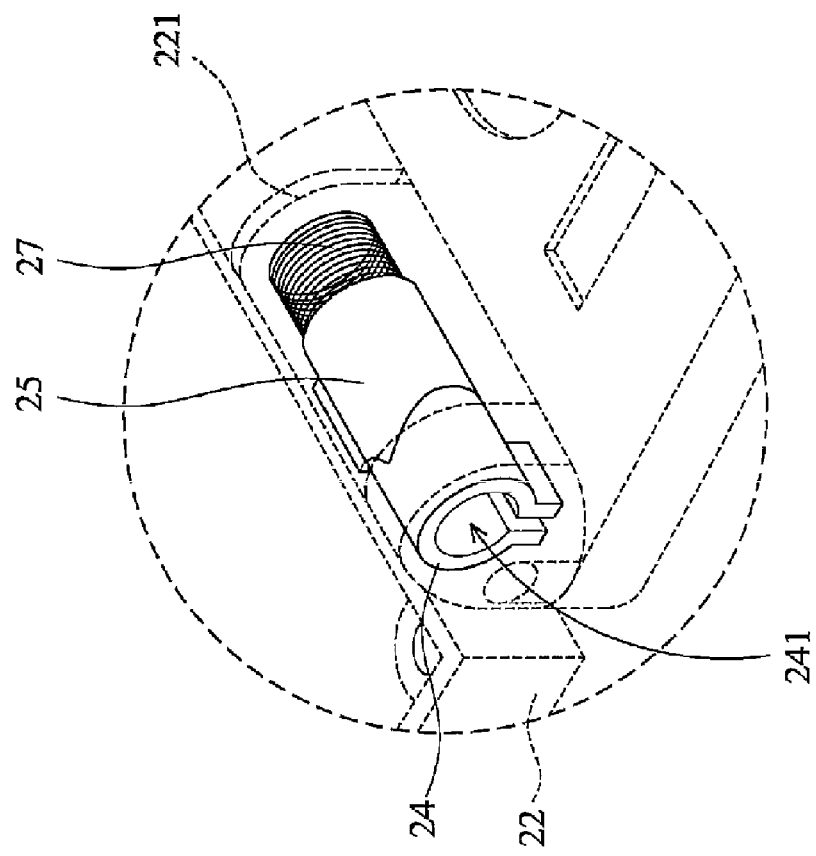
FIG. 3A is a partly enlarged view of the hinged device of an embodiment of the invention.

FIG. 3A is a partially enlarged view of the hinged device of an embodiment of the invention and FIG. 3B is a schematic diagram of the electrical transmission media 26 passed through the first cam 24 and the second cam 25.

The first cam 24 is fixed on the first frame 21 and has a first through hole 241. The second cam 25 is movably disposed in the second frame 22 and has a second through hole 251. The first cam 24 contacts with the second cam 25 and the electrical transmission media 26 passes through the first cam 24 and the second cam 25 via the first through hole 241 and the second through hole 251, as shown in FIG. 3B.

Figure 4B:
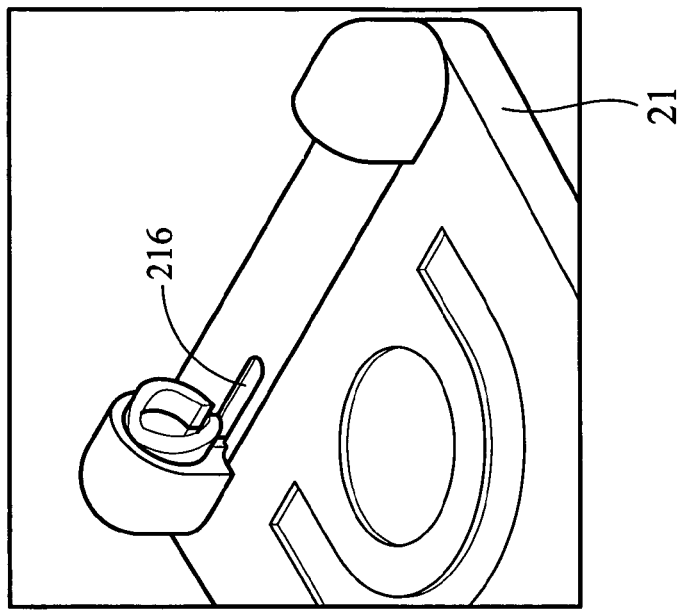
FIG. 4B is a schematic diagram of the first cam disposed on a first frame.
Figure 4A:
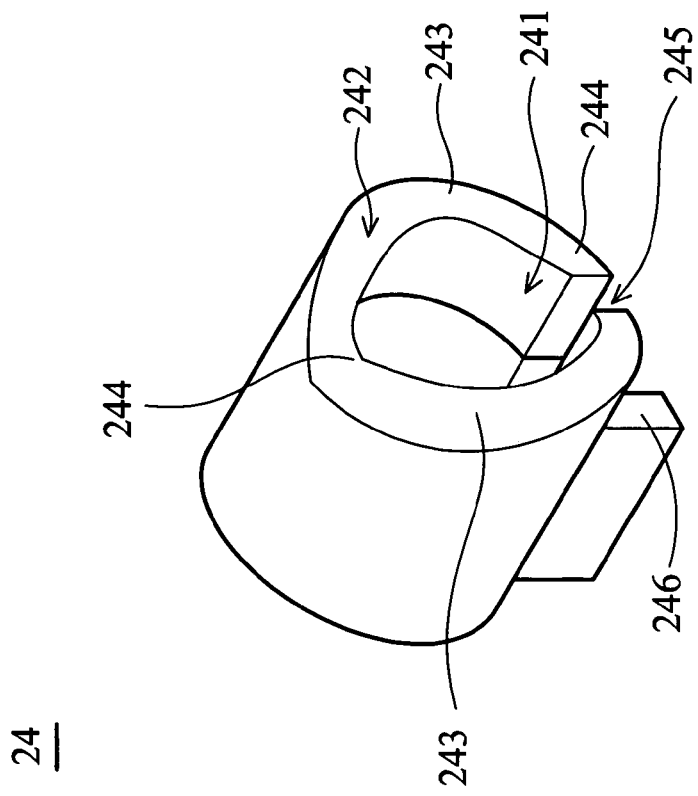
FIG. 4A is a schematic diagram of a first cam of an embodiment of the invention.

FIGS. 4A and 4B show the first cam of an embodiment of the invention. FIG. 4A is a perspective view of the first cam and FIG. 4B shows the first cam disposed on the first frame. Note that the first cam and the first frame can be separately or integrally formed.

The first cam 24 comprises a first through hole 241, a first contact surface 242, a first slot 245, and a first extension portion 246. The first contact surface 242 comprises a first peak 243 and a first foot 244. When the first cam 24 and the first frame 21 are integrally formed, the first through hole 241, the first contact surface 242, the first slot 245, and the first extension portion 246 are directly formed on the first frame 21.

The diameter of the first through hole 241 exceeds or is equal to the diameter of the electrical transmission media 26, permitting passage thereof. The first contact surface 242 may be a curved surface to generate different torsions at different positions. The first slot 245 is near the first foot 244 and the first extension portion 246 is adjacent to the first slot 245. The first frame 21 comprises a recess 216, and the first extension portion 246 of the first cam 24 is inserted into the recess 216 so that the first cam 24 is fixed on the first frame 21. The first through hole 241 of the first cam 24 communicates with the first frame 21 via the first slot 245. Therefore, the electrical transmission media 26 passing through the first through hole 241 of the first cam 24 may further pass through the first slot 245 and the first extension portion 246 to electrically connect to electronic elements (not shown) in the first frame 21.

Figure 5B:
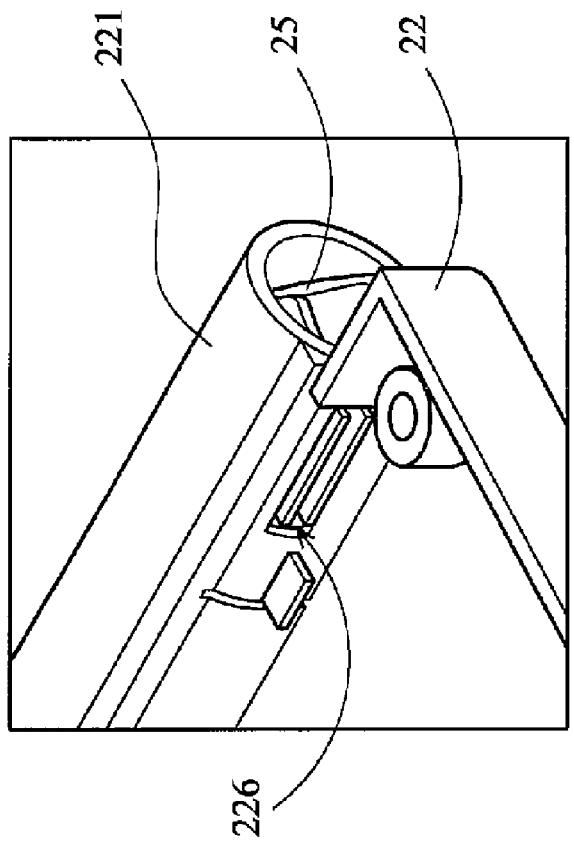
FIG. 5B is a schematic diagram of the second cam disposed on a second frame.
Figure 5A:
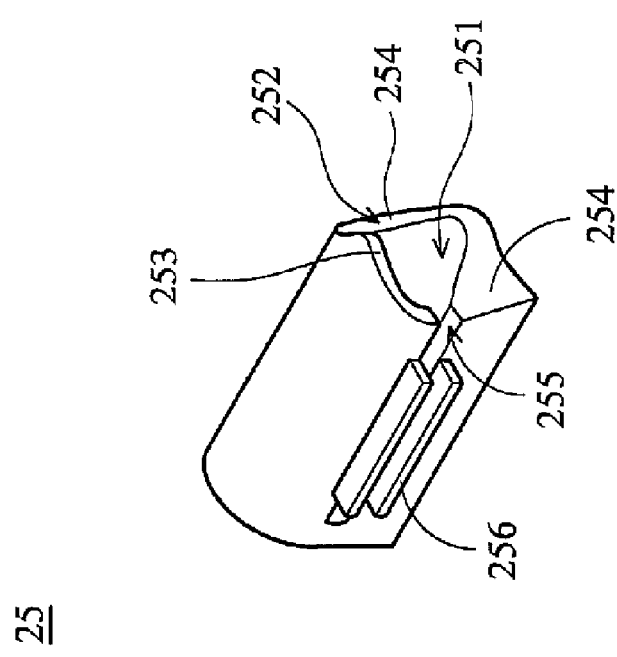
FIG. 5A is a schematic diagram of a second cam of an embodiment of the invention.

FIGS. 5A and 5B show the second cam of an embodiment of the invention. FIG. 5A is a perspective view of the second cam and FIG. 5B shows the second cam disposed on the second frame.

The second cam 25 comprises a second through hole 251, a second contact surface 252, a second slot 255, and a second extension portion 256. The second contact surface 252 comprises a second peak 253 and a second foot 254.

The diameter of the second through hole 251 exceeds or is equal to the diameter of the electrical transmission media 26, so that the electrical transmission media 26 can pass through the second through hole 251. The second contact surface 252 may be a curved surface to generate different torsions at different positions. The second slot 255 is near the second foot 254 and the second extension portion 256 is adjacent to the second slot 255. The second frame 22 comprises a groove 226, and the second extension portion 256 of the second cam 25 is movably inserted into the groove 226 so that the second cam 25 is movably connected to the second frame 22. The second through hole 251 of the second cam 25 communicates with the second frame 22 via the second slot 255. Therefore, the electrical transmission media 26 passing through the second through hole 251 of the second cam 25 may further pass through the second slot 255 and the second extension portion 256 to electrically connect to electronic elements (not shown) in the second frame 22.

In the previously described situation, the first contact surface 242 of the first cam 24 contacts the second contact surface 252 of the second cam 25, and the first contact surface 242 corresponds to the second contact surface 252.

Figure 6B:
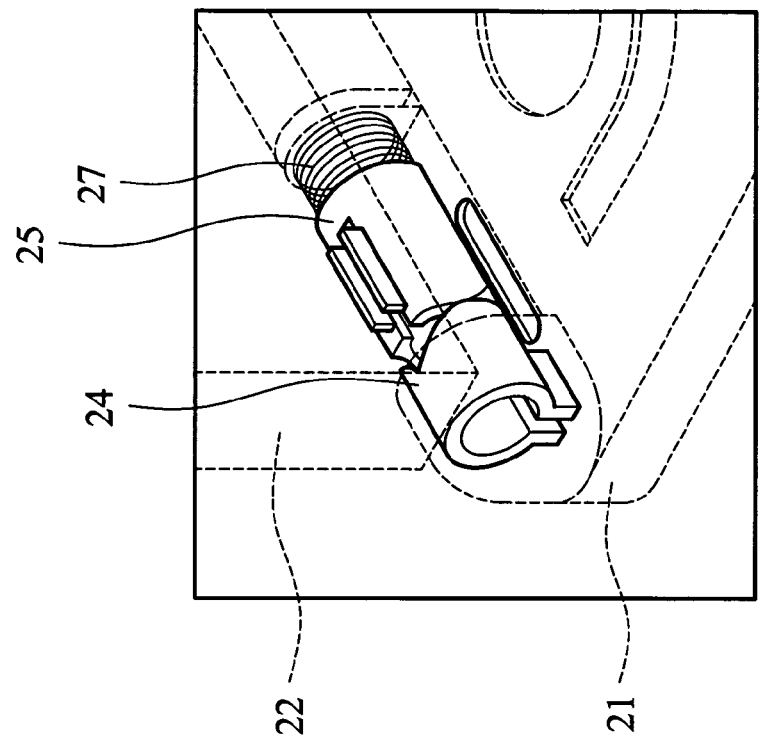
FIG. 6B a schematic diagram of the hinged device of an embodiment of the invention in operation.
Figure 6A:
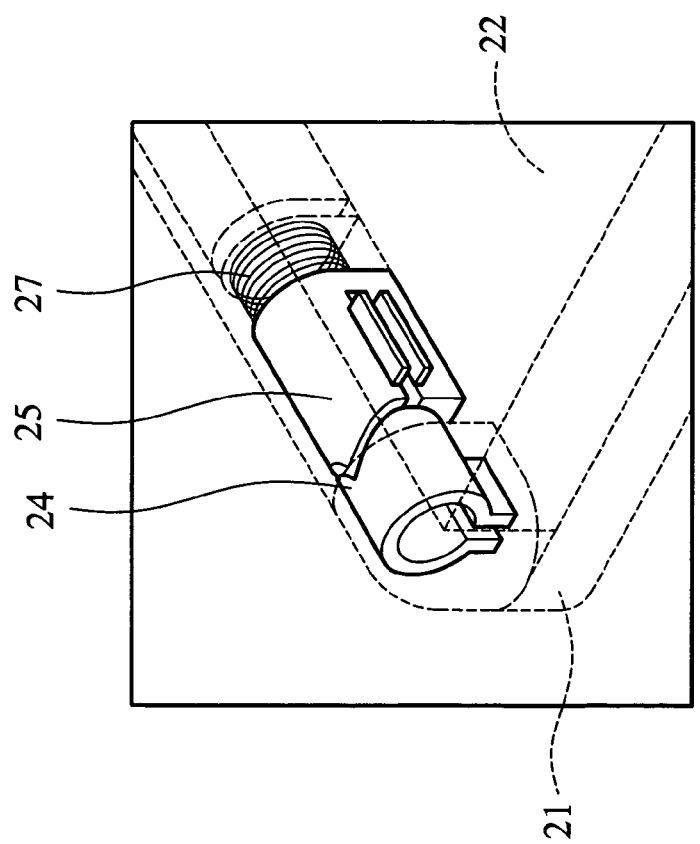
FIG. 6A is a schematic diagram of a hinged device of an embodiment of the invention in a closed position.
Figure 6C:
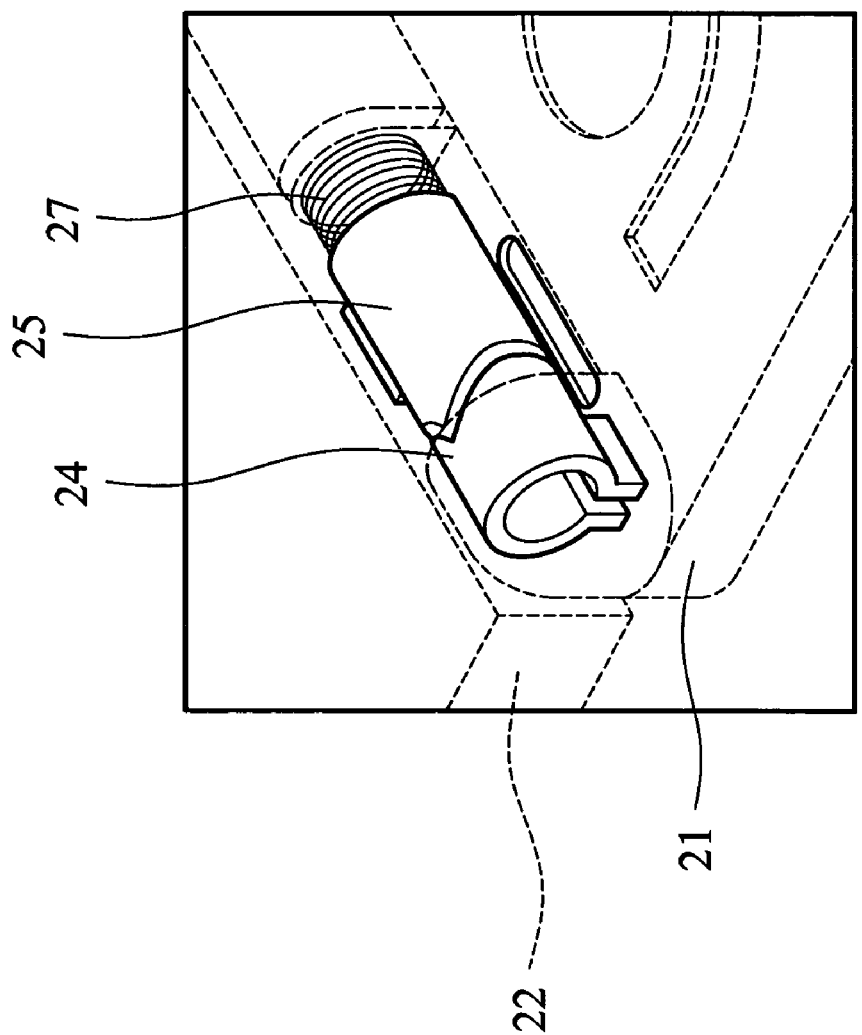
FIG. 6C is a schematic diagram of the hinged device of an embodiment of the invention in an open position.

FIGS. 6A to 6C show the operation of the hinged device and the relationship between the first cam 24 and the second cam 25. FIG. 6A is a schematic diagram of the hinged device of an embodiment of the invention in a closed position. FIG. 6B is a schematic diagram of the hinged device of an embodiment of the invention in operation. FIG. 6C is a schematic diagram of the hinged device of an embodiment of the invention in an open position.

When assembly is complete, as shown in FIG. 6A, the hinged device is closed, and the first frame 21 and the second frame 22 are in a first relative position. The first contact surface 242 of the first cam 24 abuts the second contact surface 252 of the second cam 25 with the first peak 243 contacting the second foot 254. The elastic member 27 is in a released position. Namely, tension is not accumulated in the elastic member 27.

During operation of the hinged device, the first frame 21 and the second frame 22 are rotated oppositely around the first direction, as shown in FIG. 6B. The first frame 21 and the second frame 22 are now in a second relative position. The first peak 243 of the first contact surface 242 contacts the second peak 253 of the second contact surface 252. Thus, the elastic member 27 is pressed by the second cam 25.

In FIG. 6C, tension is accumulated in the elastic member 27 when in the second relative position, so that the second cam 25 is pushed by the elastic member 27 toward the first cam 24 along the first direction and moved in the groove 226. Thus, the second frame 22 continually rotates until the hinged device is totally open.

In this embodiment, the hinged device may be a portable telephone, the first frame 21 may comprise a plurality of keys, and the second frame 22 may comprise a display. The electrical transmission media 26 can pass through the first cam 24 and the second cam 25 to electrically connect electronic elements in the first frame 21 and the second frame 22, reducing the space required by the hinged device. The first cam 24 and the second cam 25 may be metal or plastic. Preferably the first cam 24 and the second cam 25 are metal to prevent electromagnetic interference (EMI). When the first cam 24 and the second cam 25 are plastic, a metal plate is provided to prevent electromagnetic interference (EMI).

Figure 7B:
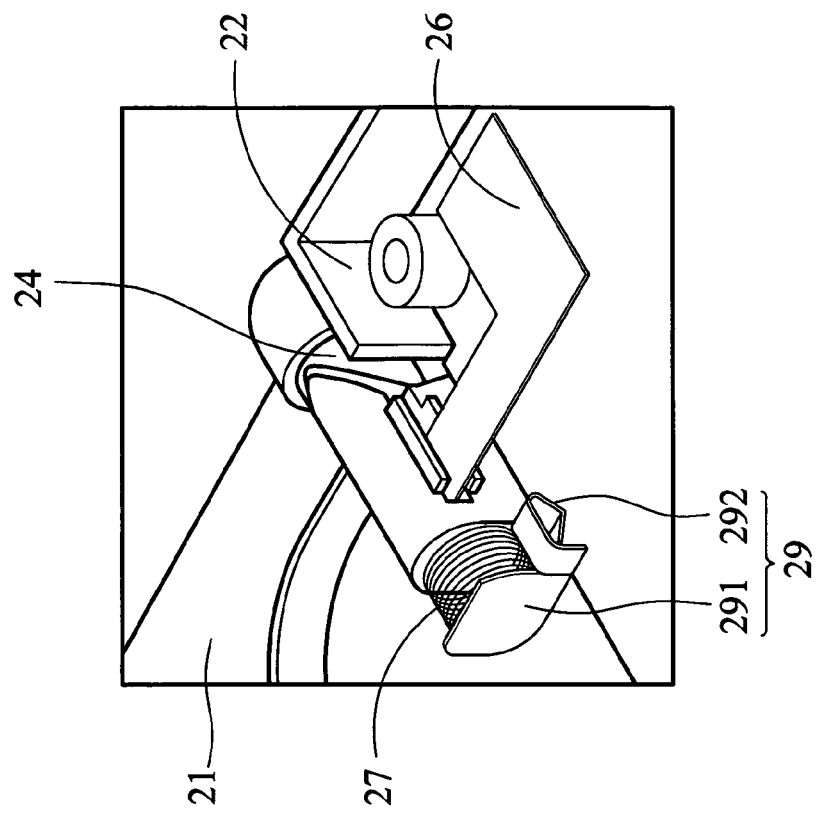
FIG. 7B is a schematic diagram of a second metal plate disposed on a second frame of an embodiment of the invention.
Figure 7A:
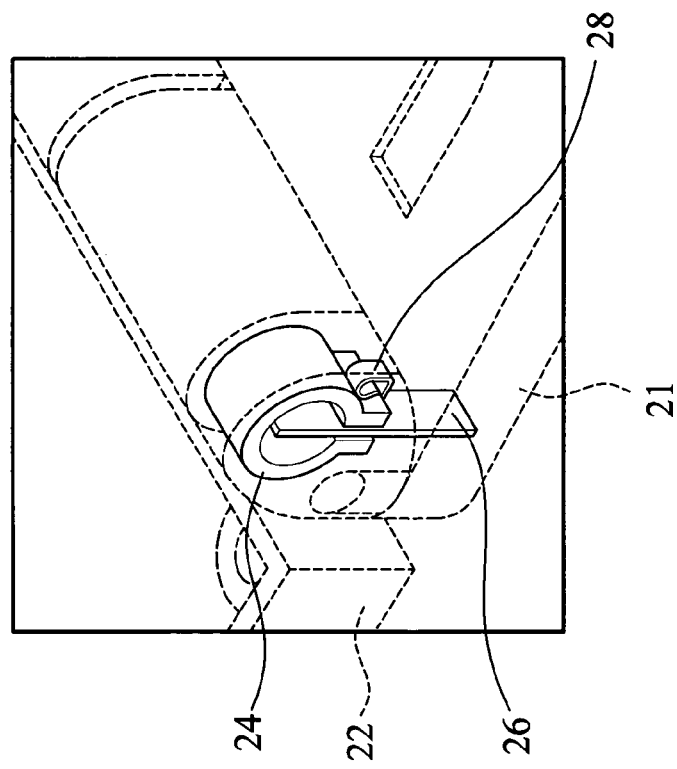
FIG. 7A is a schematic diagram of a first metal plate disposed on a first frame of an embodiment of the invention.
Figure 7C:
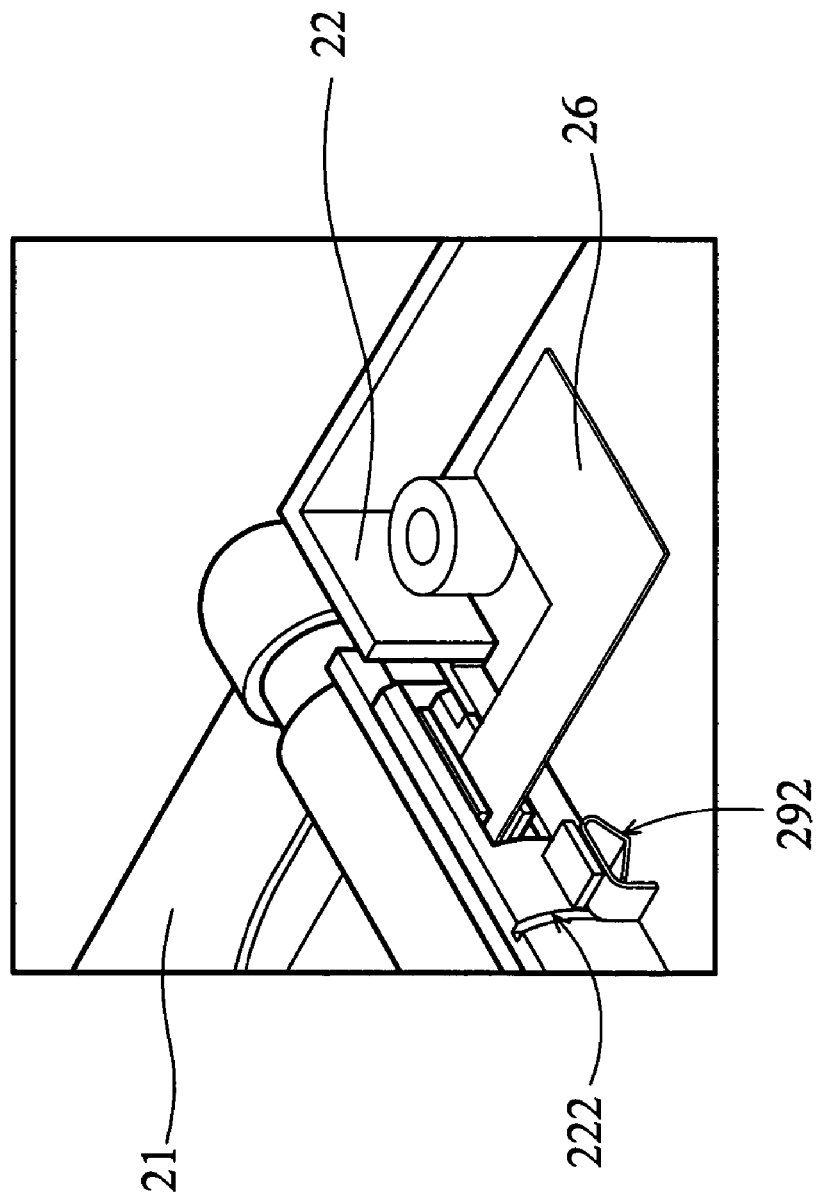
FIG. 7C is another schematic diagram of the second metal plate disposed on the second frame of an embodiment of the invention.

FIGS. 7A to 7C show metal plates disposed in a hinged device of an embodiment of the invention. FIG. 7A is a schematic diagram of a first metal plate disposed on a first frame of an embodiment of the invention, FIG. 7B is a schematic diagram of a second metal plate disposed on a second frame of an embodiment of the invention, and FIG. 7C is another schematic diagram of the second metal plate disposed on the second frame of an embodiment of the invention.

A first metal plate 28 is disposed in the first frame 21. The first metal plate 28 contacts with the ground of an electronic element (not shown) in the first frame 21, for preventing electromagnetic interference (EMI). A second metal plate 29 is disposed in the second frame 22. As shown in FIG. 7C, a crack 222 is formed on the second frame 22, and the second metal plate 29 is inserted into the crack 222. A flat portion 291 of the second metal plate 29 contacts the second frame 22 and the elastic member 27, and the elastic member 27 contacts the second cam 25. The second metal plate 29 further comprises a flexible portion 292, providing a second elastic force. Thus, the second metal plate 29 maintains contact with the ground of the second frame 22 due to the second elastic force, preventing electromagnetic interference (EMI).

While the invention has been described by way of example and in terms of preferred embodiments, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A hinged device, comprising:
   a first frame comprising a first cam, and the first cam having a first contact surface and a first hole, the first contact surface substantially enclosing the first hole, the first contact surface having two first peaks and two first feet;
   a second frame rotatably connected to the first frame, and the second frame having a receiving slot;
   a second cam movably disposed within the receiving slot, the second cam comprising a second contact surface and a second hole, the second contact surface substantially enclosing the second hole, the second contact surface having two second peaks and two second feet;
   an elastic member disposed between the second frame and the second cam, providing a first elastic force on the second cam along a first direction; and
   an electrical transmission media extending from the first to the second hole;
   wherein part of the second cam extended into the receiving slot, and the contact between the first cam and the second cam only occurs between the first contact surface and the second contact surface;
   wherein, when the first frame rotates relative to the second frames, the first peaks and the first feet move relative to the second peaks and the second feet, so that the second cam moves along the first direction.

2. The hinged device as claimed in claim 1, further comprising a metal plate disposed between the elastic member and the second frame, wherein the second frame comprises a ground, the metal plate connects to the ground.

3. The hinged device as claimed in claim 2, wherein the metal plate comprises a flexible portion providing a second elastic force to the ground, for maintaining contact between the metal plate and the ground.

4. The hinged device as claimed in claim 1, wherein when the first peak contacts the second foot, the first and second frames are maintained at a first relative position.

5. The hinged device as claimed in claim 4, wherein when the first peak contacts the second peak, the first elastic force applied on the second cam pushes the first and second frames to rotate toward the first relative position.

6. The hinged device as claimed in claim 1, wherein the first cam further comprises a first slot, and the electrical transmission media extends in the first slot, the first slot extends to one of the first feet of the first contact surface, so that the first contact surface is substantially U shaped.

7. The hinged device as claimed in claim 6, wherein the first cam further comprises a first extension portion near the first slot, the first frame further comprises a first recess, and the first extension portions is disposed in the first recess so that the first cam is fixed on the first frame.

8. The hinged device as claimed in claim 7, wherein the electrical transmission media enters the first frame via the first recess.

9. The hinged device as claimed in claim 6, wherein the first cam further comprises two first extension portions, the first slot is formed between both first extension portions, the first frame further comprises a first recess, and the first extension portions are disposed in the first recess, so that the first cam is fixed on the first frame.

10. The hinged device as claimed in claim 1, wherein the second cam further comprises a second slot, the electrical transmission media extends in the second slot, the second slot extends to one of the second feet of the second contact surface, so that the second contact surface is substantially U shaped.

11. The hinged device as claimed in claim 10, wherein the second cam further comprises a second extension portion near the second slot, the second frame comprises a groove extending along the first direction, and the second extension portion is disposed in the groove so that the second cam is movably connected to the second frame.

12. The hinged device as claimed in claim 11, wherein the electrical transmission media enters the second frame via the first groove.

13. The hinged device as claimed in claim 10, wherein the second cam further comprises two second extension portions, and the second slot is formed between both of the second extension portions, the first frame further comprises a groove extending along the first direction, and both of the second extension portions are disposed in the groove so that the second cam is movably connected to the second frame.

14. The hinged device as claimed in claim 1, wherein the hinged device is a portable telephone, the first frame further comprises a plurality of keys, and the second frame comprises a display.

15. The hinged device as claimed in claim 1, wherein the first hole having a first center and the second hole having a second center, and the electrical transmission media extending along the first center and the second center.

* * * * *